United States Patent [19]

Kawaharazaki

[11] 4,212,435
[45] Jul. 15, 1980

[54] SEATBELT RETRACTOR

[75] Inventor: Takashi Kawaharazaki, Toyoake, Japan

[73] Assignee: Kabushiki Kaisha Tokai Rika Denki Seisakusho, Aichi, Japan

[21] Appl. No.: 9,675

[22] Filed: Feb. 5, 1979

[30] Foreign Application Priority Data

Feb. 9, 1978 [JP] Japan .......................... 53-15171[U]

[51] Int. Cl.² ...................... A62B 35/02; B65H 75/48
[52] U.S. Cl. .............................. 242/107; 242/107.4 R
[58] Field of Search ........................ 242/107–107.7; 297/388; 280/801–808

[56] References Cited

U.S. PATENT DOCUMENTS

| | | | |
|---|---|---|---|
| 3,984,063 | 10/1976 | Knierieman | 242/107.4 R |
| 4,081,153 | 3/1978 | Tanaka et al. | 242/107.4 R X |
| 4,113,201 | 9/1978 | Ziv | 242/107.4 R X |
| 4,126,282 | 11/1978 | Morita et al. | 242/107.4 R X |

Primary Examiner—John M. Jillions
Attorney, Agent, or Firm—Koda and Androlia

[57] ABSTRACT

A first and a second springs are connected in series to a take-up shaft of a seatbelt so as to generate wind-up force; when the seatbelt is put on by an occupant, a pawl is engaged with a latch gear provided at a connecting portion between said springs, whereby the biasing of only one of said spring is imparted to the take-up shaft, thereby decreasing the wind-up force of the take-up shaft; after the seatbelt is released from the occupant, the pawl is disengaged from the latch gear by a camplate means connected to the take-up shaft through a one-way clutch, by which the wind-up force of the take-up shaft is imparted when the relative rotation between the camplate and the take-up shaft is more than one thirds of ρ turn, whereby the wind-up force of the take-up shaft is increased and the condition where the wind-up force is maintained at a low level even when the occupant moves his body with the seatbelt being worn by the occupant.

4 Claims, 10 Drawing Figures

SEATBELT RETRACTOR

BACKGROUND OF THE INVENTION

1. Field of the Invention

The present invention relates to seatbelt retractors in which a seatbelt for protecting an occupant is wound up by a biasing force and stored, and more particularly to a seatbelt retractor in which it is contemplated that an oppressive feeling applied to the occupant while the seatbelt is worn by the occupant is reduced.

2. Description of the Prior Art

The seatbelt retractor is adapted to wind up the seatbelt by its biasing force, whereby said biasing force gives an oppressive feeling to the occupant even while he wears the seatbelt around his body, so that the occupant is fatigued with the oppressive feeling, thus resulting in decreased seatbelt wearing rate by the occupants.

Accordingly, a proposal for such a seatbelt retractor has been made that the biasing force for winding up the seatbelt is decreased while the occupant wears the seatbelt to thereby decrease the oppressive feeling to the occupant. In this seatbelt retractor, two springs for winding up the seatbelt are serially connected to each other, while the occupant wears the seatbelt, a pawl is engaged with a ratchet wheel provided at the joint between the two springs, whereby the biasing force of only one spring for winding up the seatbelt is applied to the seatbelt, thereby reducing the oppressive feeling to the occupant.

However, with this seatbelt retractor, in the case the take-up shaft is turned one turn in the wind-up direction, the pawl is disengaged from the ratchet wheel. In this case if the occupant winds out the seatbelt more than a length corresponding to one turn of the take-up shaft and winds up the seatbelt by the same length as above, a large biasing force for winding up the seatbelt is applied to the occupant, and consequently, the zone within which the wind-out and wind-up operations for the seatbelt can be performed, i.e. a comfort zone is significantly small.

SUMMARY OF THE INVENTION

In view of the facts as described above, the present invention has as its object the provision of a seatbelt retractor in which the comfort zone is large and very comfortable wearing condition is obtainable. The seatbelt retractor according to the present invention is constructed such that a one-way clutch connects the take-up shaft to a camplate for disengaging the pawl from the ratchet wheel in a manner that the wind-up force of the take-up shaft is imparted to the camplate when the relative turning between the take-up shaft and the camplate amounts to one thirds of a turn, thereby enabling to achieve the aforesaid object.

Description will hereunder be given of one embodiment of the present invention with reference to the drawings.

DESCRIPTION OF THE PREFERRED EMBODIMENT

Figure 1:
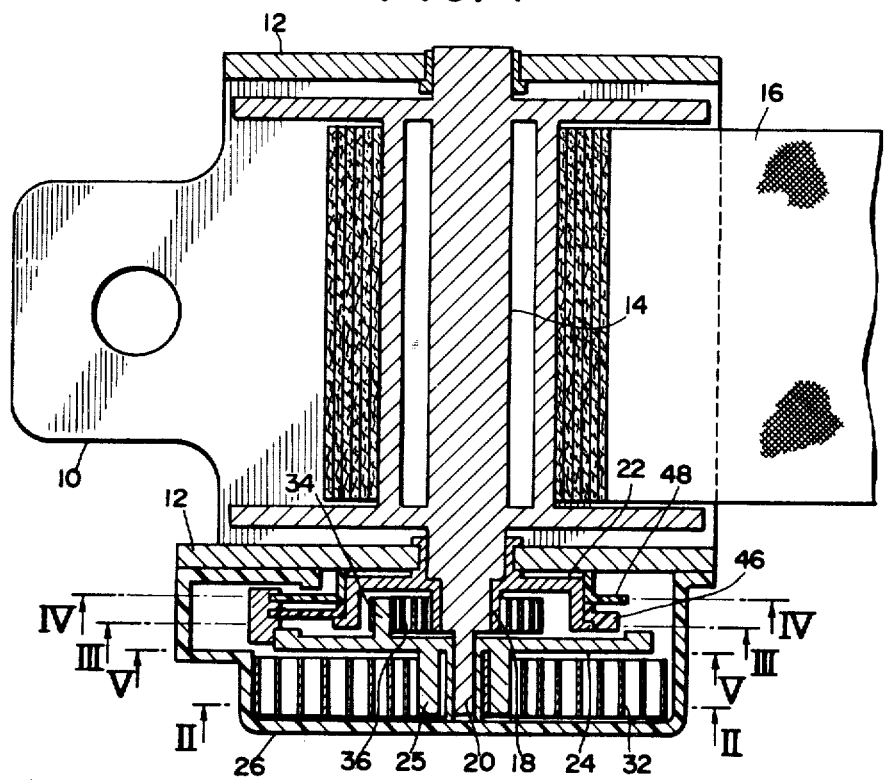
FIG. 1 is a sectional view showing one embodiment of the seatbelt retractor according to the present invention.

Referring to the drawings, a main body 10 of a retractor of the seatbelt retractor is made of a thin metal sheet, formed into substantially a letter 'U' shaped and whose legs 12,12 are pivoted thereon with a take-up shaft 14. Engaged with said take-up shaft 14 is one end of a seatbelt 16 so that said take-up shaft 14 can rotate in the wind-up direction (in the direction indicated by an arrow A in FIGS. 2 and 3) to thereby wind up the seatbelt in layers. Furthermore, said seatbelt 16 is arranged such that, after winding out a required length thereof from the retractor, it engages a tongue plate secured to the other end not shown with buckle means whereby the seatbelt 16 is brought into contact with the body of the occupant, being wound around the body, so that the occupant can be restrained.

Figure 3:
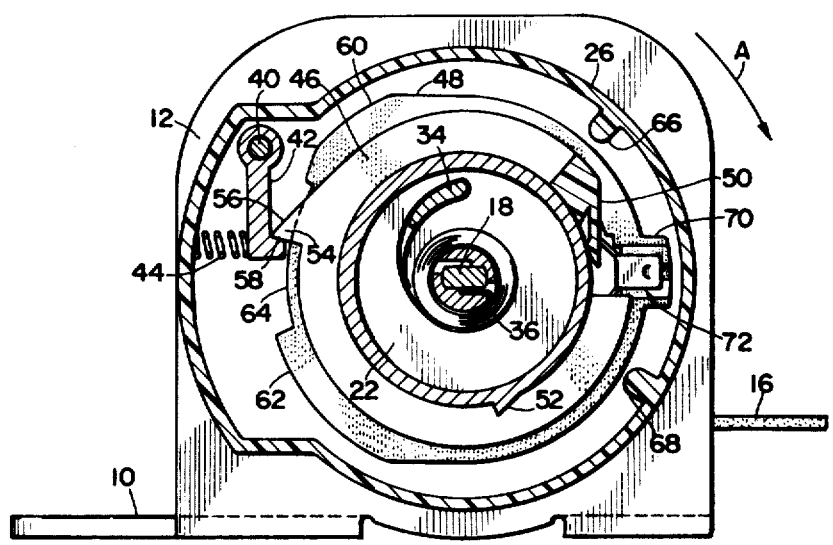
FIG. 3 is a sectional view taken along the line III—III in FIG. 1.

The take-up shaft 14 projecting from one of the legs 12 of the main body 10 is formed with a parallelly-faced narrowed-down portion 18 and the end portion of the shaft is ending into a small diameter portion 20 less in diameter than the portion of engaging the seatbelt. Coupled to said parallelly-faced narrowed-down portion 18 of the take-up shaft 14 is a rectangular shaft hole divided into two of a gear wheel 22 as shown in FIG. 3 and coupled into said small diameter portion 20 is a shaft portion 25 of a latch gear wheel 24 whereby the gear wheel 24 is povitally supported so that the gear wheel 22 can rotate along with the take-up shaft 14 and the latch gear wheel 24 can freely rotate independently of the take-up shaft 14.

Figure 2:
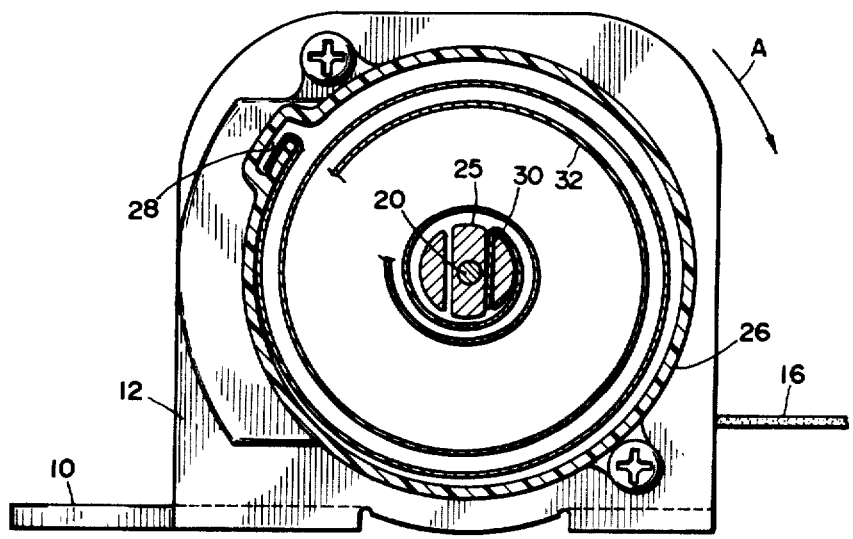
FIG. 2 is a sectional view taken along the line II—II in FIG. 1.

These gear wheel 22 and latch gear wheel 24 are housed in a spring box 26 installed on the side surface of one of the legs 12 of the main body 10. As shown in FIG. 2, engaged with a slit 28 provided on the inner peripheral surface of the spring box 26 and a slit 30 formed in a shaft portion 25 of the latch gear wheel 24, respectively, are the internal and external ends of the first spring 32 to thereby bias the latch gear wheel in the direction indicated by the arrow A. Additionally, a bracket 34 having a wing shaped cross-section and projecting in the direction opposite to the shaft portion 25 of the latch gear wheel is wound around by the external end of the second spring 36 and engaged therewith, and the internal end of the second spring 36 is inserted into and engaged with a space formed between the gear wheel 22 and the parallelly-faced narrowed-down portion 18 to thereby bias the gear wheel 22 in the direction indicated by the arrow A.

Consequently, these first and second springs 32,36 are connected in series to each other through the latch gear 24 and adapted to bias the take-up shaft 14 in the direction of winding up the seatbelt 16 in cooperation. Said second spring 36 is adapted to have a biasing force, i.e. generating torque is less than that of the first spring 32. Furthermore, for these springs, the spiral springs are used, however, of course, it is possible to use usual tension springs through a slight change in design.

Carvingly provided on the outer periphery of said latch gear wheel 24 are latch gears 38 which are ratchets facing in one direction only. These latch gears 38 and the pawl 42 oscillatingly movably pivoted through a pivot 40 on one of the legs 12 of the main body 10 constitute ratchet means. Said pawl 42 is biased toward the latch gears 38 by the biasing force of a compression coil spring 44 confined between the spring box and the pawl 42 itself, and, when engaged with the latch gear 38, is adapted to prevent the latch gear wheel 24 from rotating in the direction indicated by the arrow A. Consequently, when the ratchet means is engaged, the biasing force of said first spring 32 is imparted to neither the gear wheel 22 nor the take-up shaft 14, and only the second spring 36 is adapted to act as the wind-up force for the seatbelt 16.

Coupled to the outer periphery of the gear wheel 22 rotatable along with the take-up shaft 14 are a camplate 46 and a friction plate 48, both of which receive the turning force of the gear wheel 22 by the frictional force.

As shown in FIG. 3, this camplate 46 is integrally, projectingly provided at a portion thereof with an arm 50 which constitutes a one-way clutch in cooperation with a latch 52 notchingly provided on the outer periphery of the gear wheel 22. This one-way clutch engages the arm 50 to rotate the camplate 46 only when the gear wheel 22 rotates in the direction indicated by an arrow A, i.e. the wind-up direction of the take-up shaft. Since the latch 52 is formed at one portion on the outer periphery of the gear wheel 22, the gear wheel 22, depending on the position where the camplate 46 stops, is adapted to engage the latch 52 thereof with the arm 50 to impart the wind-up force of the take-up shaft 14 to the camplate 46 only when the gear wheel 22 rotates one turn at the maximum. While, in the case the gear wheel 22 rotates in the reverse direction, i.e. the wind-out direction of the take-up shaft, a turning force only through the frictional force is adapted to be imparted to the camplate 46 through the arm 50.

Furthermore, a substantially triangular ridge 54 is provided at a portion of the outer periphery of said camplate 46, and said ridge 54 has an inclined surface 56 functioning as a cam surface and a vertical furface functioning as a stopper surface, both of which abut against the pawl 42 at the time of rotation.

With the arrangement as described above, said camplate 46, when the gear wheel 22 rotates in the direction indicated by the arrow A, rotates along therewith, with the result that the cam surface 56 urges up the pawl 42 against the biasing force of the compression coil spring 44, and, when the gear wheel 22 rotates in the direction opposite to the above, said camplate 46 is lightly rotated due to the frictional force with the gear wheel 22, with the result that the stopper surface 58 abuts against a hook-shaped portion of the pawl 42 as shown in FIG. 3, to thereby prevent further rotation.

Figure 8:
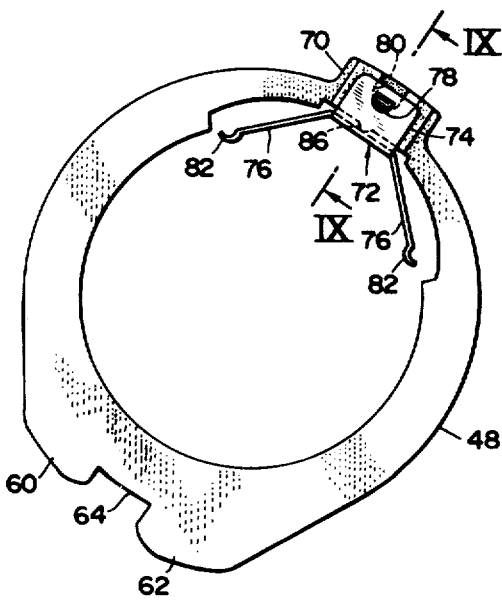
FIG. 8 is a front view showing the camplate.

Next, the friction plate 48 mounted on the gear wheel 22 similarly to the camplate 46 is provided on the outer periphery thereof with a wind-out operation holding portion 60 and a wind-up operation holding portion 62 across a bottom 64 as in FIG. 8, both of which are projected radially. Additionally, the frictional plate 48 is provided thereon at a position opposite to said portions 60 and 62 with a protrusion 70 for regulating the angle of rotation of the frictional plate 48 between stoppers 66 and 68 which are arranged at a proper interval along the inner periphery of the spring box 26.

Figure 9:
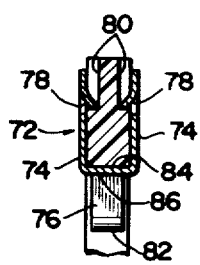
FIG. 9 is a sectional view taken along the line IX—IX in FIG. 8.

Furthermore, as shown in FIGS. 8 and 9, the protrusion 70 is installed with a resilient member 72. Said resilient member 72 consists of a letter 'U' shaped base portion 74 and two projecting portions 76 integrally formed on said base portion 74. The base portion 74 clamps the protrusion 70 in the direction of wall thickness thereof and semicircularly shaved-up pieces 78 which are portions of the base portion 74 is engaged with bottom portions of letter 'U' shaped grooves 80 formed in the protrusion 70 to thereby prevent the base portion 74 from falling. Said two projections 76 are spread outwardly in a manner that the respective longitudinal axes cross at an obtuse angle, and are arranged such that the outer periphery of the gear wheel 22 comes into contact with and between said two projections 76. The contact of the projections 76 with the outer peripheral surface of the gear wheel 22 is made by semicircular arcuate portions 82 provided at the forward end portions of the projections 76.

Additionally, the base portion 74 of said resilient member 72 has its letter 'U' shaped bottom 84 be in contact with the forward end portion of a triangular ridge 86 inwardly projecting from the friction plate 48, and hence, the state of contact at this portion is a substantially linear contact and the resilient member 72 is adapted to be oscillatingly movable about said contact portion.

Consequently, in the case of receiving frictional resistance from the gear wheel 22, i.e. in the case the take-up shaft 14 rotates in either direction, the camplate 46 is adapted to receive the same frictional resistance.

Figure 4:
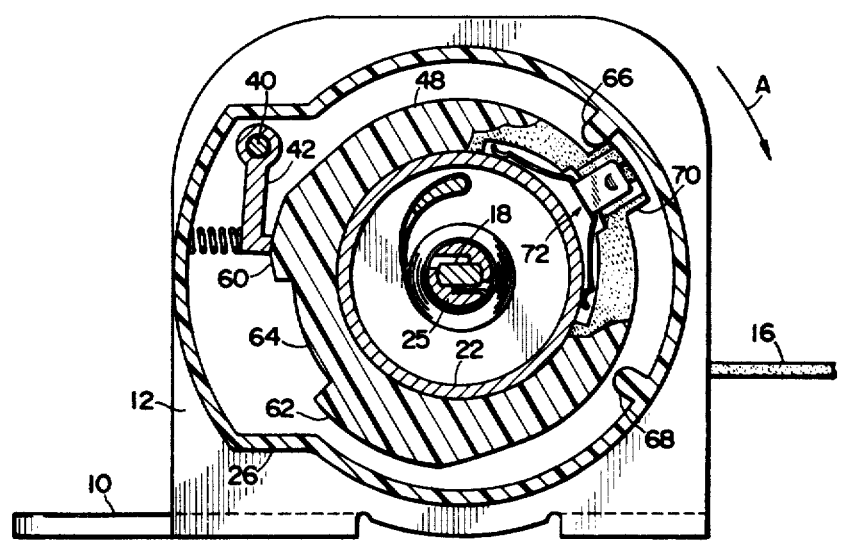
FIG. 4 is a sectional view taken along the line IV—IV in FIG. 1.
Figure 5:
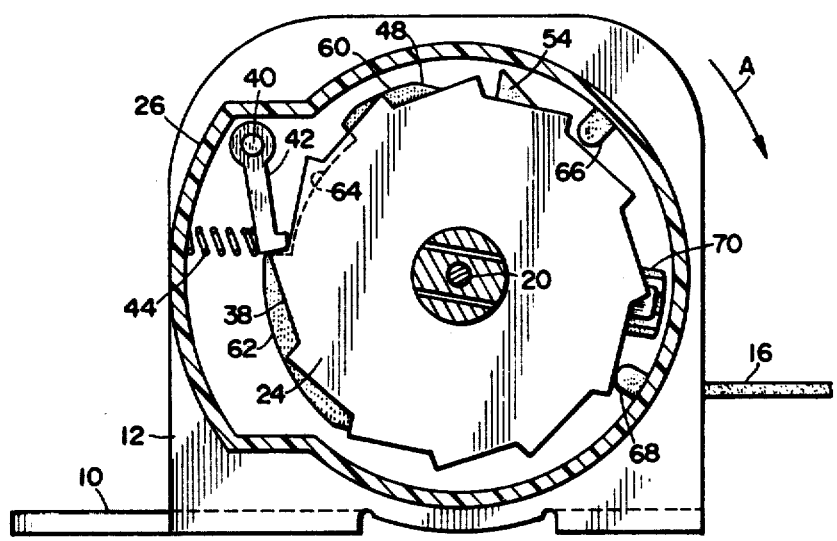
FIG. 5 through 7 are sectional views in explanation of the operating conditions in the sectional view taken along the line V—V in FIG. 1.
Figure 7:
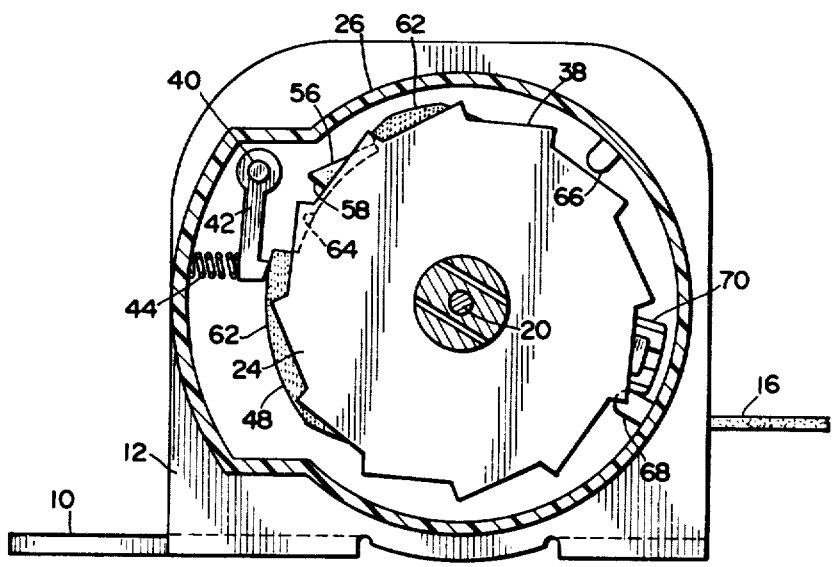

As described above, when the protrusion 70 to which the resilient member 72 is installed abuts against the stopper 66 in the spring box 26 as shown in FIG. 4, the wind-out operation holding portion 60 urges up the pawl 42 to thereby prevent said pawl 42 from coming into contact with the latch gear wheel 24. Additionally, when the protrusion 70 abuts against the stopper 68 as shown in FIG. 7, the wind-up operation holding portion 62 similarly urges up the pawl 42 to thereby prevent the latch gear wheel 24 from coming into contact with the pawl 42. Unevenness on the friction plate 48 is designed to have such a suitable contour that, when the pawl 42 is coupled into the bottom 64, the pawl 42 engages the latch gear 38 of the latch gear wheel 24 as shown in FIG. 5, thereby not imparting the biasing force of the first spring 32 to the take-up shaft 14. For this reason, the radially projecting lengths of the latch gear 38 of the latch gear wheel 24, of the ridge 54 of the camplate 46 and of the wind-out and wind-up operation holding portions 60,62 of the friction plate 48 are designed such that that of the ridge 54 is largest and that of the latch gear 38 is least.

Description will hereunder be given of the operation of the present embodiment as described above. In the condition where the occupant winds the seatbelt out to put on it, the take-up shaft 14 rotates in the direction opposite the direcction indicated by the arrow A, and the gear wheel 22 rotating therewith rotates the camplate 46 and the friction plate 48 in the same direction by the frictional force. By this, the camplate 46 rotates until the stopper surface 58 of the projection 54 abuts against the pawl 42, the friction plate 48 rotates until the wind-out operation holder 60 also abuts against the pawl 42 and stops thereat, (the gear wheel 22 further continues to rotate in the wind-out direction in sliding contact with camplate 46 and friction plate 48).

Here, the latch gear wheel 24 provided at the connecting portion between the two springs rotates along with the wind-out of the webbing in the direction opposite to that indicated by the arrow A, and hence, when the seatbelt is further drawn out, the latch gear 38 urges up the pawl 42 against the biasing force of the compression coil spring 44, with the result that the stopping of the wind-out operation holding portion 60 is released, thus rotating the friction plate 48, and further, the operation holding portion 60 turns the pawl 42 in the clockwise direction to a position the pawl 42 does not come into contact with the latch gear 38. Thereafter, when the protrusion 70 of the friction plate 48 comes into contact with the stopper 66, the rotation of the friction plate 48 is stopped again and slips with the gear wheel 22. In this condition, the wind-out operation holding portion 60 urges up the pawl 42, with the result that the pawl 46 does not come into contact with the latch gear 38 so that the latch gear 38 can freely rotate in the wind-out direction of the seatbelt.

As described above, the webbing is drawn out and the seatbelt is worn with the tongue plate being inserted into a buckle not shown. Normally, the seatbelt 16 is wound out to a length slightly longer than the length required for being worn by the occupant, and hence, such a wind-up operation is caused as to correspond to the excessive length described above. In this case, the gear wheel 22 rotates in the direction indicated by the arrow A in FIG. 4, the friction plate 48 rotates in the direction indicated by the arrow A due to the friction forces with the camplate 46 and the gear wheel 22, and the pawl 42 falls into the bottom 64 of the friction plate 48. Consequently, the pawl 42 meshes with the latch gear 38 of the latch gear wheel 24 as shown in FIG. 5. Namely, the rotation of the latch gear in the direction indicated by the arrow A (in the wind-up direction of the seatbelt) is restricted, whereby the first spring 32 whose internal end is connected to the latch gear wheel 24 falls into a locked condition, so that only the biasing force of the second spring 36 is applied to the take-up shaft 14.

By this, the biasing force applied to the seatbelt 16 is reduced, thereby improving the fitness of the seatbelt for the occupant.

Figure 6:
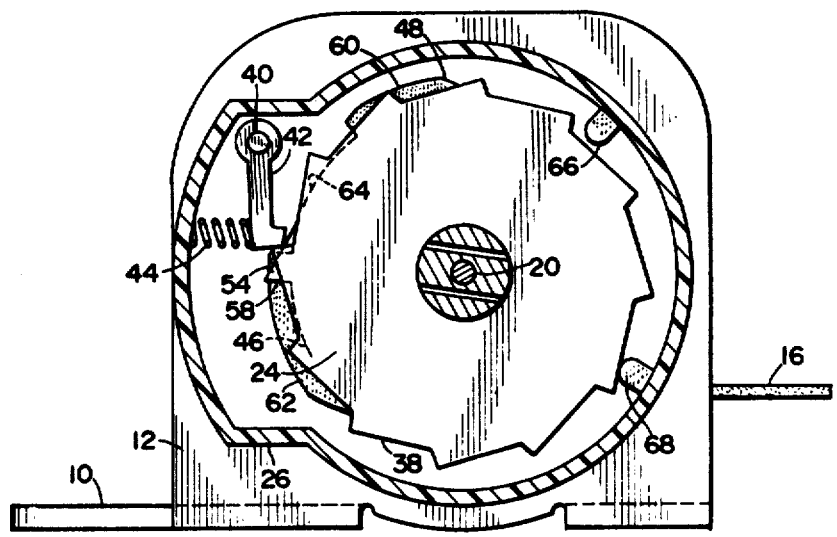

This is the condition where the seatbelt is worn by the occupant, and this condition includes in the range thereof the behavior of the occupant in the car cabin such as the wind-out and wind-up operations of the seatbelt required for operating a cigar lighter, a car radio and the like. Next, description will be given of the case of housing the seatbelt 16 into the wind-up device. If assumption is made that FIG. 5 is the condition where the seatbelt is worn by the occupant, then the ridge 54 of the camplate is positioned in the upper portion of FIG. 5. When the wind-up of the seatbelt 16 by means of the second spring 36 is begun from this condition, due to the meshing of the one-way clutch, the ridge 54 rotates integrally with the take-up shaft 14 in the direction indicated by the arrow A, reaches the position shown in FIG. 6 where it comes into contact with the tooth top of the pawl 42, and further rotates with the cam surface 56 thereof urging up the tooth top of the pawl 42. In this case, of course, the tooth top of the pawl 42 is meshed with the latch gear 38, and hence, the torque of the first spring 32 acts on the pawl 42 as a load. However, due to the meshing of the one-way clutch, the cam surface 56 can urge up the pawl 42, overcoming said load. Further, when the camplate 46 rotates, the meshing between the tooth top of the pawl and the latch gear 38 is released and the positional relationship shown in FIG. 7 is resulted. By this, the second spring 36 which has been wound back is inserted into a position where the torque is balanced at once by means of the first spring 32, whereby the wind-up force acting on the seatbelt 16 comes to be high. In this case, the friction plate 48 rotates along with the camplate 46 in the direction indicated by the arrow A due to the clockwise rotation of the take-up shaft 14, when the camplate 46 has completely urged up the pawl 42, the wind-up operation holding portion 62 maintains the tooth top of the pawl not to mesh with the latch gear 38 as shown in FIG. 7, so that the latch gear 38 can freely rotate in the clockwise direction. Consequently, the rotation of the latch gear 38 accompanied by the subsequent wind-up operation of the seatbelt is not restricted, so that the seatbelt wind-up force acting on the seatbelt 16 can house the seatbelt at a high level of force.

Next, in the case the occupant has moved his upper body after putting on the seatbelt, the projection 54 of the camplate 46 rotates, as the seatbelt winds out, from the condition shown in FIG. 5 where the seatbelt is worn by the occupant in the direction opposite the direction indicated by the arrow A, and is stopped in its rotation at the position shown in FIG. 3. If the wind-up operation is started from the position shown in FIG. 3, the one-way clutch formed by the latch 52 and the arm 50 of the camplate 46 is actuated to cause the cam surface 56 of the camplate 46 to unlock the latch gear 38, so that the seatbelt wind-up force can reach a high level regardless of the condition where the seatbelt is worn by the occupant.

However, since the latch 52 is formed at one place on the outer periphery of the gear wheel 22 in the present embodiment, the latch 52, depending on the position where the latch 52 stops, has an allowance of one turn at the maximum from the time the latch 52 starts rotating by itself to the time the latch 52 starts rotating the camplate 46 in the wind-up direction of the seatbelt. Further, there is left an allowance of about one turn from the condition shown in FIG. 3 to the condition where the projection 54 of the camplate 46 rotates in the clockwise direction to push up the pawl. Accordingly, until the take-up shaft 14 rotates two turns at the maximum and one turn at the minimum, the wind-up force does not reach the high level. More specifically, in the case the occupant has moved his upper body, with the seatbelt being worn, to the extent that the take-up shaft rotates two turns at the maximum and one turn at the minimum, the wind-up force of the seatbelt is secured to a low level (the comfort zone). If a latch 52 formed along the whole length of the outer periphery of the gear wheel 22, the take-up shaft 14 rotates one turn at the maximum to cause the wind-up force to reach a high level so that the comfort zone becomes considerably small. Additionally, the more the latches 52 in number are provided along the outer periphery of the gear wheel 22, the smaller the comfort zone becomes.

Next, in such an extra case that the seatbelt is wound out more than the comfort zone, the wind-up rotation made thereafter causes the seatbelt wind-up force to reach a high level. However, if, thereafter, there occurs a seatbelt wind-out operation accompanied by a slight movement of the occupant, the camplate 46 and the friction plate 48, from the positional relationship shown in FIG. 7, rotate in the counterclockwise direction, reaches the positional relationship shown in FIG. 3, and, through the subsequent wind-up operation, the meshing relationship between the latch gear 38 and the pawl 42 as shown in FIG. 5 is established.

Accordingly, the wind-up force acting on the seatbelt 16 falls to a low level of force, thereby enabling to reduce the feeling of being restrained for the occupant.

Figure 10:
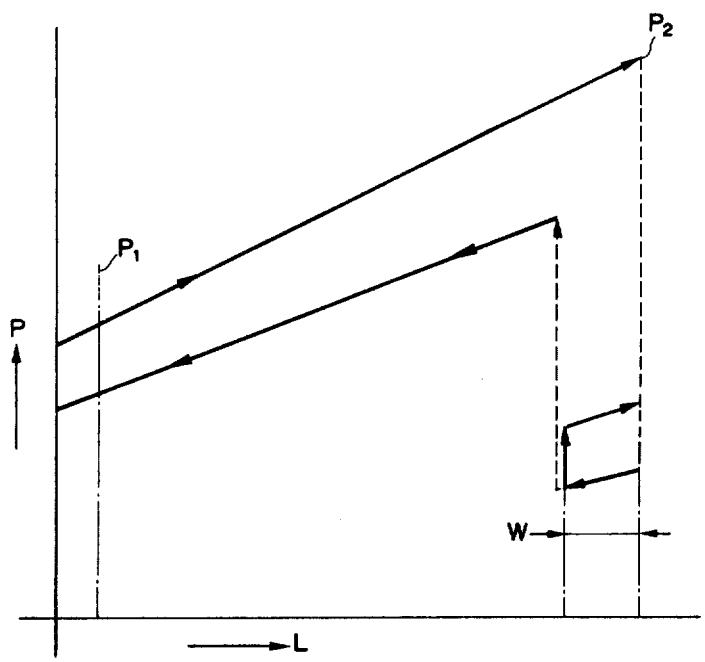
FIG. 10 is the characteristic diagram of the operation of the present embodiment.

Description will hereunder be given of the operation as described above with reference to the characteristic diagram shown in FIG. 10. With the seatbelt retractor according to the present invention, at the limits of two turns at the maximum (in the case the number of latches 52 is only one) after the seatbelt wind-out operation at a desired position, the wind-up force is changed to a low level, whereby the feeling of being restrained for the occupant when he wears the seatbelt on is reduced and the wind-up force after said one turn is changed to a high level, so that the performance of housing the wind-up device of the seatbelt can be improved. In addition, in FIG. 10, designated at P is the tension of the seatbelt, P1 the position wherein the seatbelt is within the housing, P2 a desired seatbelt wind-up starting position, W the seatbelt tension reducing range, i.e. the range of length wherein the occupant wears the seatbelt on, and L a wind-out length of the seatbelt.

In addition, in the embodiment described above, as the means of arranging a one-way clutch in a space formed between the camplate 46 and the gear wheel 22, there adopted the gear wheel 22 integrally formed with the latch 52 and the camplate 46 also integrally formed with the arm 50. However, if the integral formation of the arm 50 is difficult, a spring member separately provided can be attached to the camplate 46. Furthermore, in the present embodiment, the friction plate 48 is provided thereon with the wind-out operation holding portion 60, whereby the pawl 42 is held not to mesh with the latch gear 38 at the time of wind-out operation of the seatbelt. However, this can be abandoned and, instead, a holding portion is added to the ridge 54 of the camplate 46, so that the pawl 42 can be held by means of the camplate 46.

As has been described so far, according to the present invention, such an advantage is offered that, when the relative rotation between the camplate for pushing up the pawl and the take-up shaft is one thirds of a turn, the wind-up turning force of the take-up shaft is imparted to the camplate, thereby extending the comfort zone.

What is claimed is:

1. A seatbelt retractor comprising:
    spring means in which a first spring and second spring weaker in biasing force than the first spring are connected in series and further connected to a seatbelt take-up shaft so as to render the force for winding up the seatbelt;
    ratchet means comprising a pawl for engagement with a latch gear provided at a connecting portion between the first and second springs so as to prevent the biasing force of the first spring from acting on the take-up shaft;
    a friction plate cooperating with said pawl wherein the turning force of said take-up shaft is imparted thereto by a frictionally contacting means so as to engage said pawl with the latch gear; and
    camplate means connected to the take-up shaft through a one-way clutch comprising a gear wheel which rotates together with said take-up shaft having only one latch formed thereon and an arm projecting from said camplate means which cooperates with said latch on said gear wheel, by which the wind-up force of the take-up shaft is imparted when relative rotation between the camplate means and the take-up shaft is one turn, for disengaging said latch gear from the pawl by the turning force of the take-up shaft.

2. A seatbelt retractor as set forth in claim 1, wherein said arm is integrally, projectingly provided on the camplate means.

3. A seatbelt retractor as set forth in claim 1, wherein said arm comes into contact with the gear wheel, whereby the turning force of the gear wheel is imparted to the arm by friction.

4. A seatbelt retractor as set forth in claim 1, wherein the frictionally contacting means of said friction plate comprise a pair of projecting resilient members oscillatingly connected to the friction plate and frictionally engaging said gear wheel, whereby a frictional force at a constant level is imparted to the friction plate regardless of the turning direction of the take-up shaft.

* * * * *